(12) United States Patent
Futami

(10) Patent No.: US 8,469,567 B2
(45) Date of Patent: Jun. 25, 2013

(54) OPTICAL LENS AND VEHICLE LIGHTING DEVICE USING THE SAME

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 708 days.

(21) Appl. No.: 12/686,461

(22) Filed: Jan. 13, 2010

(65) Prior Publication Data

US 2010/0177526 A1 Jul. 15, 2010

(30) Foreign Application Priority Data

Jan. 13, 2009 (JP) ................................. 2009-005021

(51) Int. Cl.
*F21V 9/00* (2006.01)

(52) U.S. Cl.
USPC ...... 362/545; 362/544; 362/800; 362/249.02; 362/307; 362/612

(58) Field of Classification Search
USPC ............... 362/518, 516, 522, 249.02, 249.01, 362/545, 511, 309, 310, 600, 612, 613, 307
See application file for complete search history.

(56) References Cited

U.S. PATENT DOCUMENTS

| | | | | |
|---|---|---|---|---|
| 2,773,172 A * | 12/1956 | Pennow | ......................... | 362/309 |
| 3,532,871 A * | 10/1970 | Shipman | ....................... | 362/506 |
| 6,726,344 B2 * | 4/2004 | Lee | ............................ | 362/249.17 |
| 6,953,271 B2 * | 10/2005 | Aynie et al. | .................... | 362/511 |
| 7,025,482 B2 * | 4/2006 | Yamashita et al. | ............ | 362/511 |
| 7,168,836 B2 | 1/2007 | Tatsukawa | | |
| 7,931,396 B2 * | 4/2011 | Suckling et al. | .............. | 362/628 |
| 7,969,531 B1 * | 6/2011 | Li et al. | ........................... | 349/65 |

FOREIGN PATENT DOCUMENTS

| | | |
|---|---|---|
| JP | 7052708 A | 2/1995 |
| JP | 2005294176 A | 10/2005 |

* cited by examiner

*Primary Examiner* — Anabel Ton
(74) *Attorney, Agent, or Firm* — Kenealy Vaidya LLP

(57) ABSTRACT

An optical lens for use in a vehicle light can be compact and less expensive and has an outer appearance that has a high commercial value and achieves a high light utilization efficiency. The optical lens can include a light incident surface that receives light from a light source and a light output surface to output the light. The light incident surface can include a center light incident surface formed at its center and being convex toward the light source with a plurality of prisms with a polygonal shape formed radially from its center to its periphery. The light output surface can include a toroidal surface corresponding to the center light incident surface and a surrounding light output surface corresponding to the prisms.

20 Claims, 10 Drawing Sheets

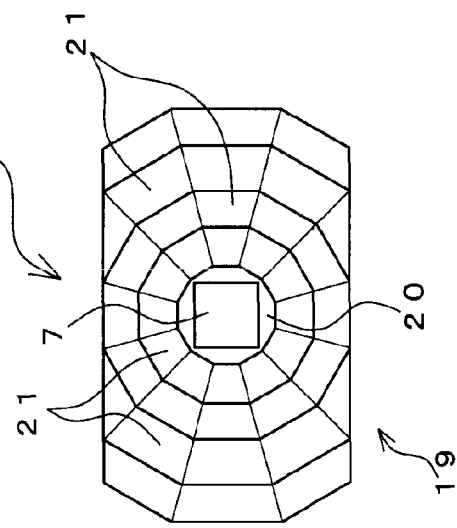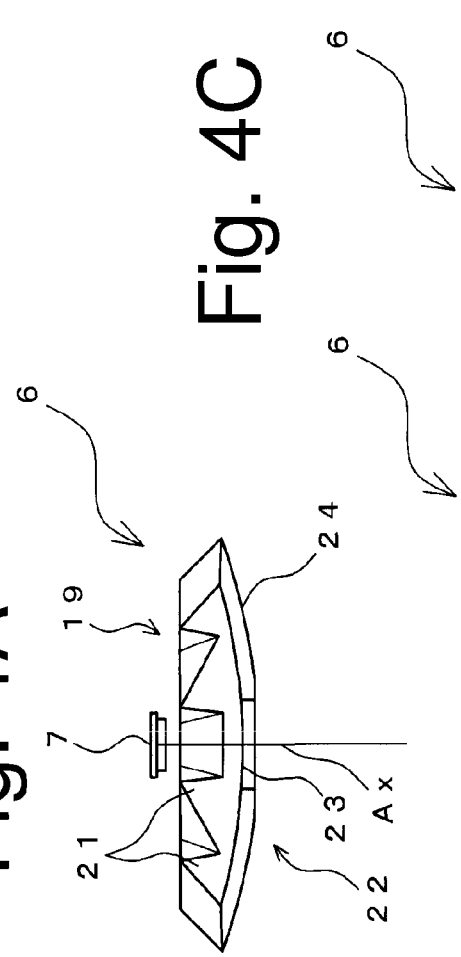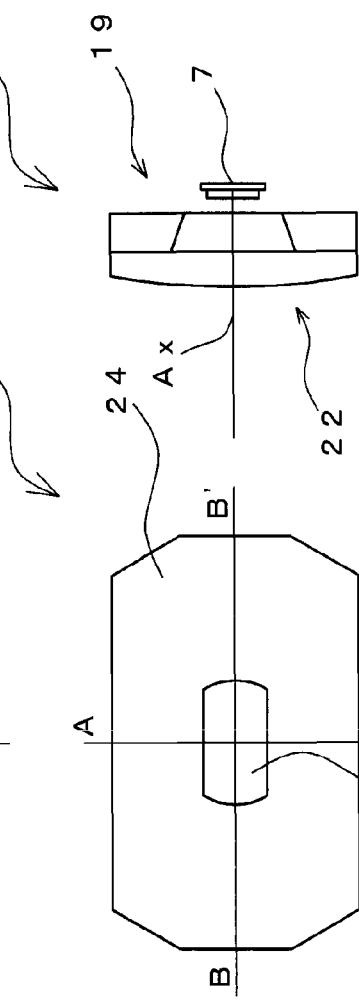

C-C'

| Unit | Cd | | | | | |
|---|---|---|---|---|---|---|
| Test Point | Requirement | | Standard Position | | Percentage of Allowance | |
| | ECE NO.87 | SAE J2087 | SIM DATA | DATA*6*0.85 | ECE | SAE |
| 10U-5L | 80 | | 51.66 | 263.5 | 329% | |
| 10U-V | 80 | | | | | |
| 10U-5R | 80 | | 54.5 | 278.0 | 347% | |
| 5U-20L | 40 | | 14.61 | 74.5 | 186% | |
| 5U-10L | 80 | 100 | 63.69 | 324.8 | 406% | 325% |
| 5U-V | 280 | 350 | 113 | 576.3 | 206% | 165% |
| 5U-10R | 80 | 100 | 65.49 | 334.0 | 417% | 334% |
| 5U-20R | 40 | | 15.52 | 79.2 | 198% | |
| H-20L | 100 | 50 | | | | |
| H-10L | 280 | 350 | 115.64 | 589.8 | 211% | 169% |
| H-5L | 360 | 450 | 130.53 | 665.7 | 185% | 148% |
| H-V | 400 | 500 | 162.89 | 830.7 | 208% | 166% |
| H-5R | 360 | 450 | 126.08 | 643.0 | 179% | 143% |
| H-10R | 280 | 350 | 107.86 | 550.1 | 196% | 157% |
| H-20R | 100 | 50 | | | | |
| 5D-20L | 40 | | 14.11 | 72.0 | 180% | |
| 5D-10L | 80 | 100 | 62.5 | 318.8 | 398% | 319% |
| 5D-V | 280 | 350 | 111.95 | 570.9 | 204% | 163% |
| 5D-10R | 80 | 100 | 63.04 | 321.5 | 402% | 322% |
| 5D-20R | 40 | | 15.79 | 80.5 | 201% | |
| Over All Max | | 1200 | 169.31 | 863.5 | | |
| Location | | | 0 | | | |
| | | | -0.8 | | | |

_US 8,469,567 B2_

OPTICAL LENS AND VEHICLE LIGHTING DEVICE USING THE SAME

This application claims the priority benefit under 35 U.S.C. §119 of Japanese Patent Application No. 2009-005021 filed on Jan. 13, 2009, which is hereby incorporated in its entirety by reference.

TECHNICAL FIELD

The presently disclosed subject matter relates to an optical lens configured to condense light emitted from a light source and distribute the condensed light within a predetermined range. The presently disclosed subject matter also relates to a vehicle light for a day-time-running light, utilizing the same.

BACKGROUND ART

A known conventional vehicle light can include a light source, a reflector for reflecting light emitted from the light source, and a light controlling/distributing lens for controlling the light emitted from the light source to distribute the light within a range in accordance with a light distribution specification (see, for example, U.S. Patent Application Publication 2005/219865A1 corresponding to Japanese Patent Application Laid-Open No. 2005-294176).

In order to present an innovative design for a light, the appearance of recent vehicle signal lights sometimes provides a crystalline-like reflection state that is different from those of conventional lights. There has been proposed another vehicle light including a lens having a surface that is close to a light source having a Fresnel lens cut and having a surface that is the light output side and has a fish-eye lens cut (see, for example, Japanese Patent No. 2971780 or Japanese Patent Application Laid-Open No. Hei 7-052708).

FIG. 1 shows the vehicle light disclosed in Japanese Patent Application Laid-Open No. Hei 7-052708. As shown in the drawing, the vehicle light can include a light body cover 1 and a light source unit 2 which is integrally installed within the light body cover 1. The light body cover 1 can have a shade part 1a, and a front opening and a lower opening 1b. The light source unit 2 can have an L-shaped cross section and a light source 5 is attached thereto. The light source unit 2 can have a perpendicular part 3 which is engaged with the shade part 1a of the light body cover 1 and a horizontal part 4 which is engaged with the lower opening 1b. These parts 3 and 4 are integrally formed. The perpendicular part 3 can function as a light output surface and have a front surface that includes a fish-eye lens 3a and a rear surface that includes a Fresnel lens 3b.

SUMMARY

The conventional configuration described above having a Fresnel lens can achieve the appearance of a crystalline-like reflection state, but does not allow for the diffusion and distribution of light to produce the desired light distribution pattern. In addition, the vehicle light having a fish-eye lens on the light output surface can form a desired light distribution pattern, but may not be able to provide a crystalline-like reflection state. In order to solve the above-mentioned problems, a vehicle light can include a lens for diffusing light and a reflector for condensing light as a countermeasure to form a desired light distribution pattern. In this case, however, although the desired light distribution pattern can be formed, the vehicle light having these optical components may inevitably have a larger depth-wise dimension with its light utilization efficiency deteriorated. Furthermore, such a configuration may result in an increased number of parts resulting in higher costs.

The presently disclosed subject matter was devised in view of these and other problems and in consideration of the features of the conventional art. According to an aspect of the presently disclosed subject matter, an optical lens for use in a vehicle light can form a desired light distribution pattern as a vehicle light, achieve a high light utilization efficiency, and provide an innovative reflection state that has a high commercial value. Furthermore, the optical lens can be compact and lower in cost. Still another aspect of the presently disclosed subject matter can provide a vehicle light utilizing such an optical lens.

According to another aspect of the presently disclosed subject matter, an optical lens can include a light incident surface and a light output surface disposed on the opposite side of a light incident side. The light incident surface can include a center light incident surface and a surrounding light incident surface where a plurality of prisms are radially arranged around the center light incident surface. The light output surface can include a center light output surface corresponding to the center light incident surface and a surrounding light output surface corresponding to the surrounding light incident surface (or the plurality of prisms). Each of the plurality of prisms can include an incident prism surface and a reflective prism surface. The incident prism surface can be an incident surface for allowing light emitted from the light source disposed in front of the light incident surface to enter the lens. The reflective prism surface can be a reflective surface for reflecting light that is emitted from the light source and which enters the incident prism surface and reaches the reflective prism surface, toward the surrounding light output surface. The center light output surface can be a light output surface for allowing light that is emitted from the predetermined light source and which enters the center light incident surface to be output. The surrounding light output surface can be a light output surface for allowing the light reflected from the reflective prism surface to be output.

The optical lens for a vehicle light can form a first light distribution pattern formed by the center light incident surface and the center light output surface and a second light distribution pattern formed by the plurality of prisms and the surrounding light output surface. These first and second light distribution patterns can be combined to form a total light distribution pattern for satisfying the light distribution specification as a vehicle light for use as a day-time-running light. Further, the present optical lens can utilize light emitted from the light source in an oblique direction with respect to an optical axis of the light source by the plurality of prisms. Accordingly, the optical lens can achieve a higher light utilization efficiency. In addition to this, the plurality of prisms can provide the appearance of a crystalline-like reflection state which can impart a high commercial value to a vehicle light. Furthermore, the vehicle light can form a desired light distribution pattern not with two components of a diffusing lens and a condensing reflector but with a single optical lens. Accordingly, the optical lens can constitute a vehicle light with compact dimensions and reduced costs.

In the optical lens configured as described above, the center light incident surface can be formed as a convex lens surface toward the light source. The center light output surface can be formed as a lens surface that can diffuse light emitted from the light source and entering the lens through the center light incident surface, in a horizontal direction. The surrounding light output surface can be formed as a lens surface that can diffuse light reflected from the reflection prism surfaces in a vertical direction and a horizontal direction so as to direct the light toward its center.

The optical lens configured as described above can refract light entering the convex center light incident surface and then diffuse the light in a horizontal direction with the center light output surface disposed opposite to the center light incident surface. The optical lens can also reflect light emitted in an oblique direction with respect to the optical axis of the light source and not entering the center light incident surface, with the plurality of prisms radially arranged around the center light incident surface to collimate the light with respect to the optical axis. The light reflected by the plurality of prisms can be diffused by the surrounding light output surface in the vertical direction and the horizontal direction so as to direct the light toward the center.

This configuration can form a first light distribution pattern formed by the center light incident surface and the center light output surface, and a second light distribution pattern formed by the plurality of prisms and the surrounding light output surface, thereby forming the total light distribution pattern for satisfying the light distribution specification as a vehicle light for use as a day-time-running light. Furthermore, light obliquely emitted from the light source with respect to the optical axis of the light source can be also effectively utilized by the plurality of prisms. This can improve light utilization efficiency. The plurality of prisms can appear as a crystalline-like reflection state which has a high commercial value. The single optical lens can form a desired light distribution pattern required for a vehicle light such as a day-time-running light with compact dimensions and reduced costs.

In the optical lens configured as described above, the center light output surface can be a toroidal surface that is configured to include a vertical cross section curved in the vertical direction for collimating the light in the vertical direction and a horizontal cross section curved in the horizontal direction for diffusing the light in the horizontal direction. The surrounding light output surface can be formed as a convex or concave lens surface.

In the optical lens configured as described above, the center light output surface can have a vertically-curved surface having a larger curvature in the vertical direction for collimating the light in the vertical direction and a horizontally-curved surface having a smaller curvature in the horizontal direction for diffusing the light in the horizontal direction. These two curved surfaces are combined to form the toroidal surface. Light refracted by the center light incident surface can be further refracted by the center light output surface, so that light diffused wider in the horizontal direction can form a desired light distribution pattern for a vehicle light such as a day-time-running light.

In the optical lens configured as above, the incident prism surface can be a light incident surface that is formed in parallel with the optical axis of the light source and allows the light emitted from the light source in an oblique direction with respect to the optical axis of the light source to enter the inside of the lens. The reflective prism surface can be a reflective surface that can reflect the light emitted from the light source and entering the incident prism surface so as to collimate the light with respect to the optical axis.

According to the optical lens configured as described above, the light that is emitted from the light source in the oblique direction with respect to the optical axis and which does not enter the center light incident surface can enter the incident prism surface formed substantially parallel with the optical axis of the light source. Furthermore, the entering light can be totally reflected by the reflective prism surface to be collimated with respect to the optical axis. This configuration can utilize almost all of the light emitted from the light source, so that light utilization efficiency of light from the light source can be improved.

According to another aspect of the presently disclosed subject matter, a vehicle light can utilize an optical lens having any of the above-mentioned configurations and combinations thereof.

A vehicle light configured as described above can form a light distribution pattern satisfying desired light distribution regulation and improved light utilization efficiency with compact dimensions and reduced costs. The vehicle light can further provide a crystalline-like reflective state that can enhance its commercial value.

BRIEF DESCRIPTION OF DRAWINGS

These and other characteristics, features, and advantages of the presently disclosed subject matter will become clear from the following description with reference to the accompanying drawings, wherein:

FIGS. 4A, 4B, 4C, and 4D are a top plan view, a front view, a right side view and a rear side view of the optical lens of FIG. 2, respectively;

DESCRIPTION OF EXEMPLARY EMBODIMENTS

A description will now be made below to optical lenses of the presently disclosed subject matter with reference to the accompanying drawings in accordance with exemplary embodiments. In the described exemplary embodiments, a description will be given of an optical lens for use as a day-time-running vehicle light as one example, but the presently disclosed subject matter is not limited to this.

Figure 1:
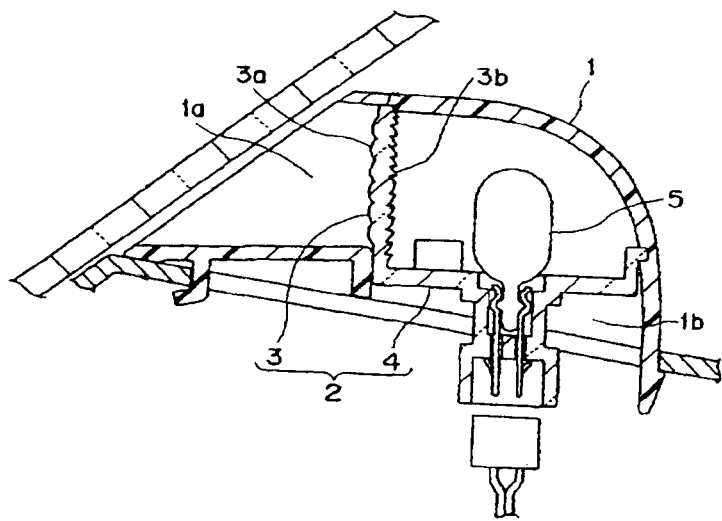
FIG. 1 is a side cross sectional view of a conventional vehicle light.
Figure 2:
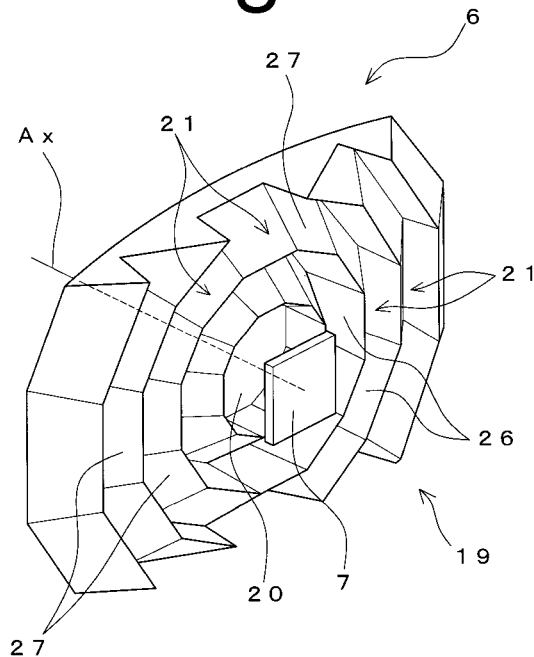
FIG. 2 is a perspective view illustrating a light incident surface of an optical lens for a vehicle light made in accordance with principles of the presently disclosed subject matter.
Figure 3:
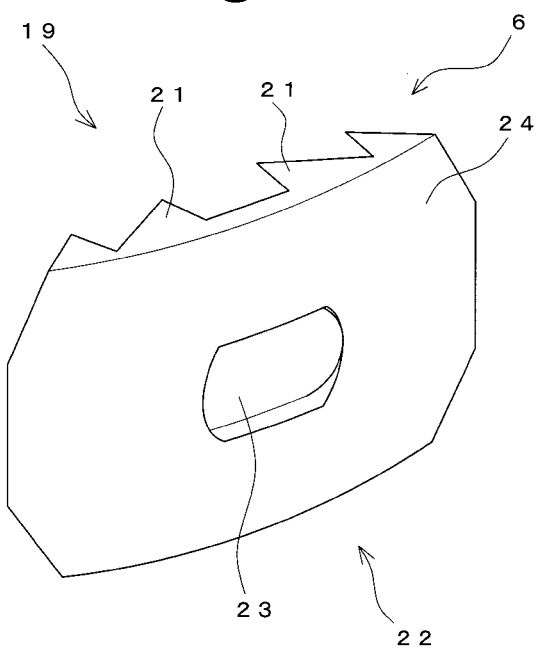
FIG. 3 is a perspective view illustrating a light output surface for the optical lens of FIG. 2.
Figure 5:
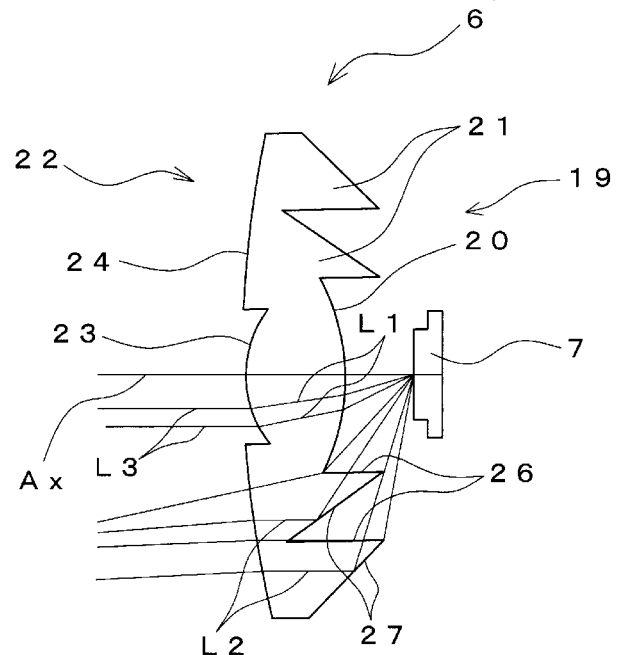
FIG. 5 is a cross sectional view illustrating the optical lens taken along line A-A' as shown in FIG. 4B.
Figure 6:
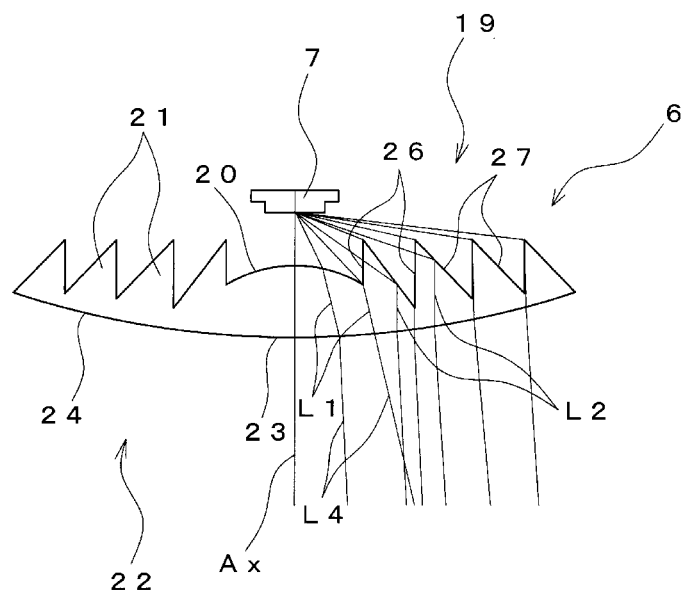
FIG. 6 is a cross sectional view illustrating the optical lens taken along line B-B' as shown in FIG. 4B.
Figure 7:
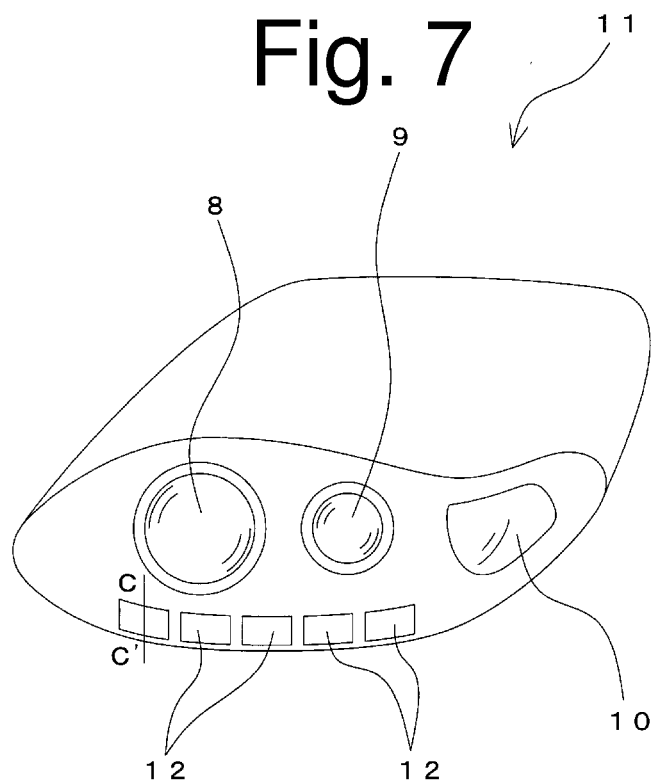
FIG. 7 is a perspective view illustrating a front combination vehicle light in accordance with a disclosed embodiment.
Figure 8:
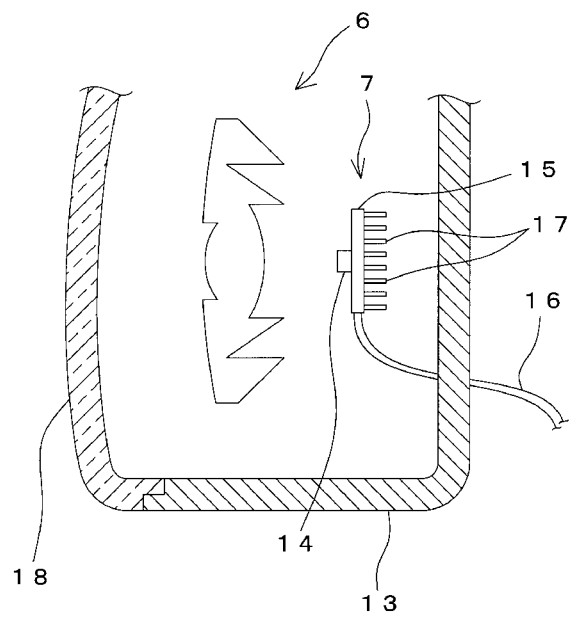
FIG. 8 is a longitudinal cross sectional view illustrating how a daytime-running light is installed, taken along line C-C' as shown in FIG. 7.

FIG. 2 is a perspective view illustrating a light incident surface of an optical lens for a vehicle light, and FIG. 3 is a perspective view illustrating a light output surface for the optical lens of FIG. 2. FIGS. 4A to 4D are a top plan view, a front view, a right side view and a rear side view of the optical lens of FIG. 2, respectively. FIG. 5 is a cross sectional view illustrating the optical lens taken along line A-A' as shown in FIG. 4B. FIG. 6 is a cross sectional view illustrating the optical lens taken along line B-B' as shown in FIG. 4B. FIG. 7 is a perspective view illustrating a front combination vehicle light in accordance with an exemplary embodiment. FIG. 8 is a longitudinal cross sectional view illustrating how a day-time-running light is installed, taken along the line C-C' as shown in FIG. 7.

The lens 6 as shown in FIG. 2 for use in a vehicle light can be an optical lens for a day-time-running light, which can always be turned on for enhancing recognition of the vehicle during day-time operation. The lens 6 can be disposed in front of an LED light source 7. The vehicle light that includes the lens 6 can form a light distribution pattern defined by a standard value for satisfying the standards for day-time-running lights in accordance with, for example, ECE No. 87 (Economic Commission for Europe).

The lens 6 can be a thin lens formed from a transparent resin material. The lens 6 can be combined with the LED light source 7 to provide a thin day-time-running light having a very small depth dimension from the light emission surface of the LED light source 7 to the surface of the lens 6.

When a day-time-running light is configured, the lens 6 and the LED light source 7 are combined to serve as a single unit and a plurality of the units are arranged according to a vehicle design. Examples of the day-time-running lights include a front combination light 11, as shown in FIG. 7, having a light 8 for use as a high beam (travelling beam), a light 9 for use as a low beam (passing beam), a signal light 10, and the like. A plurality of the day-time-running lights 12 are disposed at the lower area of the front combination light 11. As shown in FIG. 8, the day-time-running light 12 is configured such that the lens 6 and the LED light source 7 are attached to a housing 13 using an attaching member (not shown). The LED light source 7 can include a substrate 15, a light emitting element 14 disposed on the substrate 15, a feeding line 16 to be connected with the substrate 15, and a radiation fin 17. In one embodiment, an outer lens 18 may be disposed in front of the lens 6. The LED light source 7 can include the light emitting element that is disposed in a manner so as to correspond to the position of the toroidal surface 23 of the lens 6 and having a front area that is the same as, or slightly smaller than, the area of the toroidal surface 23, which will be described later.

The lens 6 is illustrated in FIGS. 2, 3, and 4A to 4D in detail. The lens 6 can have a light incident surface 19 and a light output surface 22. The light incident surface 19 can have a center light incident surface 20 and a surrounding light incident surface where a plurality of prisms 21 are radially arranged around the center light incident surface 20 from its center to the outer periphery. The center light incident surface 20 is convex toward the LED light source 7. The light output surface 22 can include a center light output surface, or a toroidal surface 23, which corresponds to the center light incident surface 20 in position, and a surrounding light output surface 24 which corresponds to the surrounding light incident surface (or the plurality of prisms 21) surrounding the toroidal surface 23.

The center light incident surface 20 can be formed as a convex lens surface having, as shown in FIG. 5, a curved surface with a curvature toward the LED light source 7. The center light incident surface 20 can refract and condense light emitted from the LED light source 7 and entering the incident surface, toward the toroidal surface 23 along the optical path L1 illustrated in FIGS. 5 and 6. The light entering the surrounding light incident surface can exit from the surrounding light output surface 24.

The plurality of prisms 21 can be disposed radially from the center to the outer periphery (see FIG. 4D) and can have an outer contour as a polygon. As shown in FIG. 5, each of the prisms 21 can include an incident prism surface 26 and a reflective prism surface 27. The incident prism surface 26 is substantially formed in parallel with the optical axis Ax of the LED light source 7. The reflective prism surface 27 is inclined with respect to the corresponding incident prism surface 26 by a predetermined angle. The incident prism surface 26 can allow the light emitted from the LED light source 7 in an oblique direction with respect to the optical axis Ax of the LED light source 7 to enter the lens 6. The reflective prism surface 27 can totally reflect light emitted from the light source 7 and entering the incident prism surface 26 so as to collimate the light with respect to the optical axis Ax. In other words, the light incident prism surfaces and the reflective prism surfaces can be combined to form respective polygonal contours around its optical axis (forming a non revolved shape). Accordingly, the vehicle light of the presently disclosed subject matter can form a light distribution pattern that is substantially parallel to the optical axis and is configured to be wide in the intended inclined direction.

The light emitted from the LED light source 7 includes light that is emitted from the LED light source 7 in the oblique direction with respect to the optical axis Ax and does not enter the center light incident surface 20. This light can enter the lens 6 by the above-configured prisms 21 along the optical path L2 illustrated in FIGS. 5 and 6. The entering light can be reflected so as to be collimated with respect to the optical axis Ax and directed to the light output surface 22.

In the present exemplary embodiment, the prisms 21 can, for example, include twelve (12) radially-divided prism areas of polygonal shape and each radial area can include three or four prisms 21. The presently disclosed subject matter is not limited to this exemplary embodiment, and can include prisms that are designed according to a desired light distribution pattern and/or vehicle light design and which have divided prism areas with an arbitrary number, polygonal shape, and radially arranged prisms with an arbitrary number.

The center light output surface of toroidal surface 23 can include a curved surface having a larger curvature R in the vertical direction than in the horizontal direction, as shown in FIGS. 5 and 6.

The toroidal surface 23 having a curved surface as described above can collimate the light refracted by the center light incident surface 20 in the vertical direction, along the light path L3 in FIG. 5. In addition to this, the toroidal surface 23 can diffuse light to a certain extent in the horizontal direction, along the light path L4 in FIG. 6. Namely, the vehicle light of the present exemplary embodiment can form a light distribution pattern narrow in the vertical direction and wide in the horizontal direction.

Figure 9:
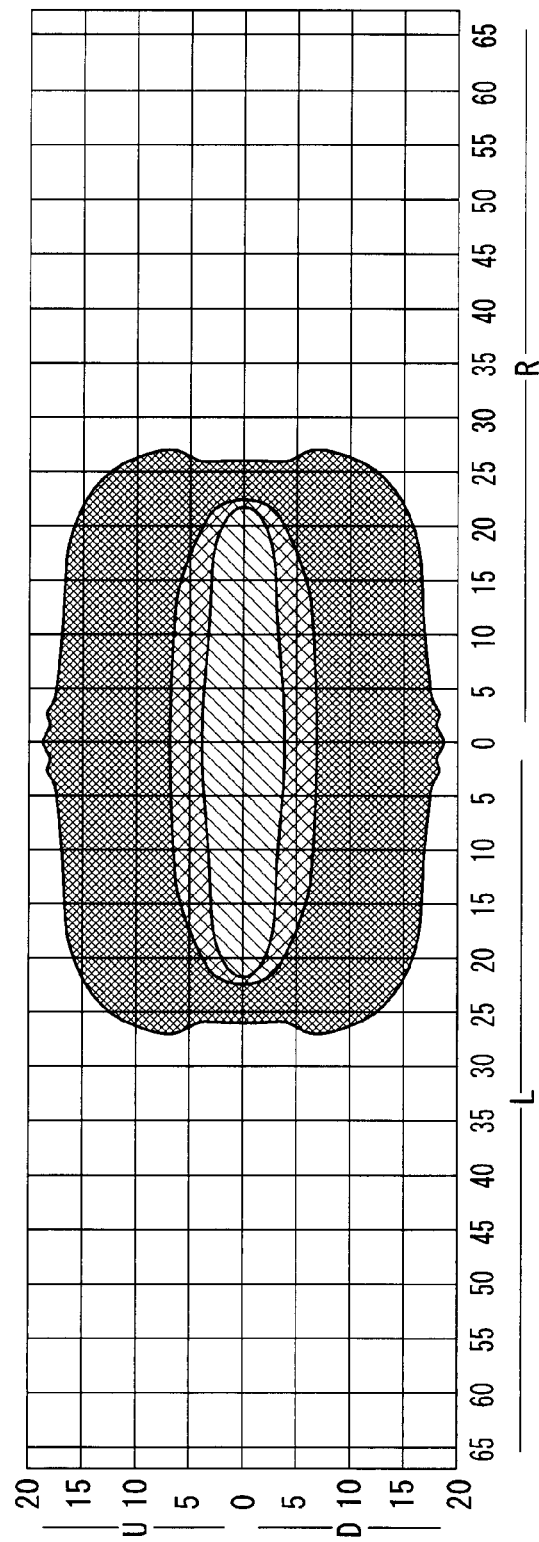
FIG. 9 is a diagram illustrating a light distribution pattern formed mainly by the center area of the lens.

The center light incident surface 20 can be disposed on the optical axis Ax of the LED light source 7, and the distance between the center light incident surface 20 and the LED light source 7 can be shortened. Accordingly, the center light incident surface 20 can receive a large amount of the light directly emitted from the LED light source 7. Furthermore, since the distance between the center light incident surface 20 and the LED light source 7 is short, the incident angle of light from the LED light source 7 on the center light incident surface 20 becomes larger as the incident point moves from the center of the center light incident surface 20 to its periphery. The thus incident light can be diffused by the toroidal surface 23 corresponding to the incident position (the further out the light is incident on the center light incident surface 20, the larger the diffused angle is by the toroidal surface 23). This configuration can form a diffusing light distribution pattern. Furthermore, since the distance between the center light incident surface 20 and the LED light source 7 can be short, the projected light source image of the light emitting element 14 of the LED light source 7 on the light incident surface 20 can be equal to the plane area of the light emitting element 14 (apparent size). Moreover, a distance between the LED light source 7 and the immediately adjacent portion of the center light incident surface 20 can be less than or substantially the same as the length of the light incident prism surfaces 26 in the optical axis Ax direction, and can also be less than 1.5 or less than twice the length of the light incident prism surfaces 26 in the optical axis Ax direction, for example. Alternatively, the distance between the LED light source 7 and the immediately adjacent portion of the center light incident surface 20 can be less than or substantially the same as the thickness of the lens 6 in the optical axis direction at the center of the light incident surface 20. As a result, a large light source image can be diffused by the toroidal surface 23 to be projected. Accordingly, the center light incident surface 20 and the toroidal surface 23 can form a uniform entire light distribution pattern as wide as shown in FIG. 9. Accordingly, this configuration can form a desired light distribution pattern for use in a vehicle light such as a day-time-running light. Please note that in this exemplary embodiment the entire luminous intensity of the light distribution pattern formed by this configuration may be half of the entire luminous intensity.

The surrounding light output surface 24 can be a convex lens surface that can diffuse light that is emitted from the LED light source 7 and collimated by the prisms 21 with respect to the optical axis Ax, in the horizontal and vertical direction.

Figure 10:
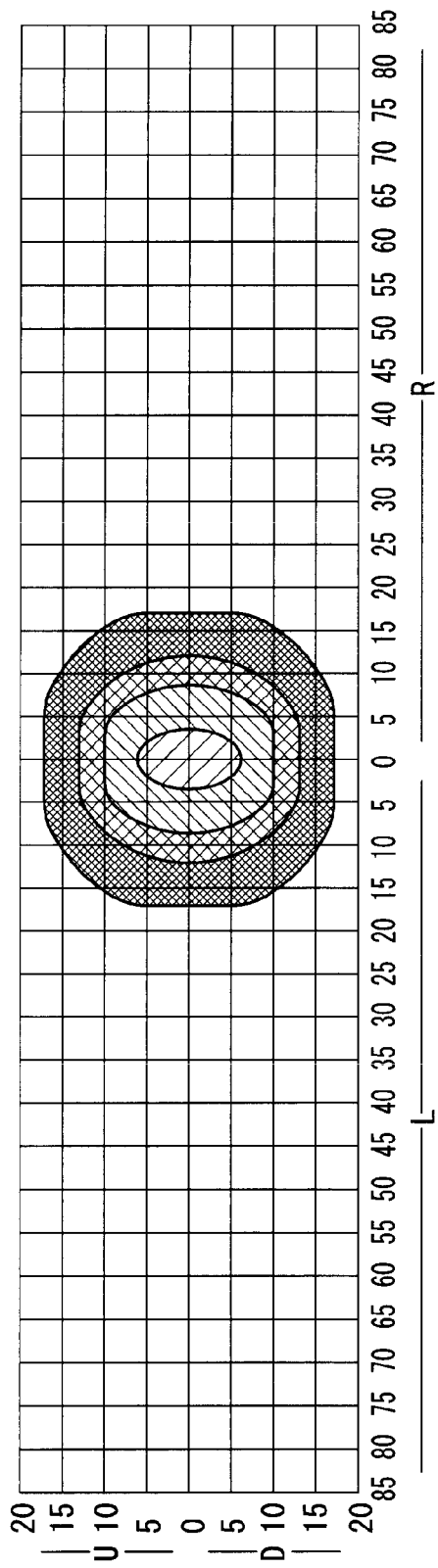
FIG. 10 is a diagram illustrating a light distribution pattern formed mainly by the peripheral area of the lens.

The prisms 21 can be disposed apart from the optical axis Ax of the LED light source 7, and accordingly, the distance between the prisms 21 and the LED light source 7 can be large relative to the distance that the LED light source 7 is spaced from an immediately adjacent portion of the center light incident surface 20. As a result, the prisms 21 can receive the light emitted from the LED light source 7 in a lessened amount. Furthermore, since the distance between the prisms 21 and the LED light source 7 is relatively large and the light incident prism surfaces 26 are formed in parallel with the optical axis Ax in this exemplary embodiment, the incident angle of light on the light incident prism surfaces 26 is very small. Accordingly, the light output from the surrounding output surface 24 can be diffused slightly, meaning the light can be gathered to an intended area. In addition, the projected light source image of the light emitting element 14 of the LED light source 7 on the prisms 21 is very small due to the image being viewed at a low angle. As a result, such a light source image with a very small projected area can be controlled to be distributed to a particular area of the desired light distribution pattern, such as its center area. Accordingly, the prisms 21 and the surrounding light output surface 24 can form a part of the light distribution pattern as shown in FIG. 10, so that the center portion of the entire light distribution pattern can be increased in light intensity.

The lens 6 as configured above can have the prisms 21 including the total reflective surfaces disposed radially. Accordingly, the adjacent prisms 21 can be reflected by the total reflective surfaces, thereby providing a crystalline-like reflective state. The light output surface 22 can be formed in a curved surface having specific curvatures. This can enhance the visibility of the crystalline-like reflective state of the prisms 21 from outside. Furthermore, the inside state can be enlarged by the effect of the convex lens, thereby providing an innovative appearance with a pseudo thickness and solid sense of the lens body. This can also enhance the commercial value.

Furthermore, almost all of the light emitted from the LED light source 7 can be utilized for forming the desired light distribution pattern by the center portion of the center light incident surface 20 and the toroidal surface 23 and the peripheral portion of the prisms 21 and the surrounding light output surface 24. According to the presently disclosed subject matter, the light utilization efficiency can be 70% or higher when compared with that of a conventional vehicle light which may be 30 to 50%. Furthermore, the distance from the LED light source 7 to the lens 6 can be shortened when compared with that of the conventional vehicle light, thereby providing a compact vehicle light utilizing this compact optical lens.

It should be noted that a decorative sheet having an aluminum deposit or having been colored can be disposed between the lens 6 and the LED light source 7 in an area where the light path from the LED light source 7 to the lens 6 cannot be hindered, thereby improving the appearance of the vehicle light.

A description will now be given of the action of the lens 6. In the lens 6, as shown in FIG. 3, the light incident surface 19 can include the center light incident surface 20 being convex with respect to the LED light source 7 at its center and the plurality of prisms 21 radially and polygonally formed surrounding the center light incident surface 20 from the center to the peripheral area. Furthermore, the light output surface 22 of the lens 6 can have the center light output surface, or the toroidal surface 23, formed so as to correspond to the center light incident surface 20 and the surrounding light output surface 24 formed so as to surround the toroidal surface 23 corresponding to the prisms 21.

The light emitted from the LED light source 7 and entering the center light incident surface 20 can be refracted and condensed toward the toroidal surface 23. The incident light can be further refracted in the vertical direction by the toroidal surface 23 so as to be collimated with respect to the optical axis Ax. At the same time, the light can be diffused in the horizontal direction to a certain extent as shown in FIG. 6. Accordingly, as shown in FIG. 9, the center portion of the lens 6 can form a light distribution pattern narrow in the vertical direction and wide in the horizontal direction so that the required standard, in particular the horizontal standard, in accordance with the required safety standard for a day-time-running light, such as specified in ECE No. 87, can be satisfied.

It should be noted that part of the light emitted from the LED light source 7 in an oblique direction by a predetermined angle or greater cannot enter the center light incident surface 20. The light can enter the inside of the lens 6 through the incident prism surfaces 26 each formed approximately in parallel with the optical axis Ax as shown in FIGS. 5 and 6. The reflective prism surfaces 27 can be formed to be inclined so that the entering light can form the predetermined light distribution pattern. Then, the entering light can be totally reflected by the reflective prism surfaces 27 to be collimated and directed to the surrounding light output surface 24. Since the surrounding light output surface 24 corresponding to the prisms 21 can be formed to have a convex curved surface with a small curvature, the approximately-collimated light can be diffused and refracted toward the center portion by the surrounding light output surface 24. Accordingly, as shown in FIG. 10, the peripheral portion of the lens 6 can form a partial light distribution pattern spread in the vertical direction so that the required standard, in particular center area standard, in accordance with the required safety standard for a day-time-running light as specified in ECE No. 87 can be satisfied. This configuration can increase the brightness in the center portion of the total light distribution pattern.

Figure 11:
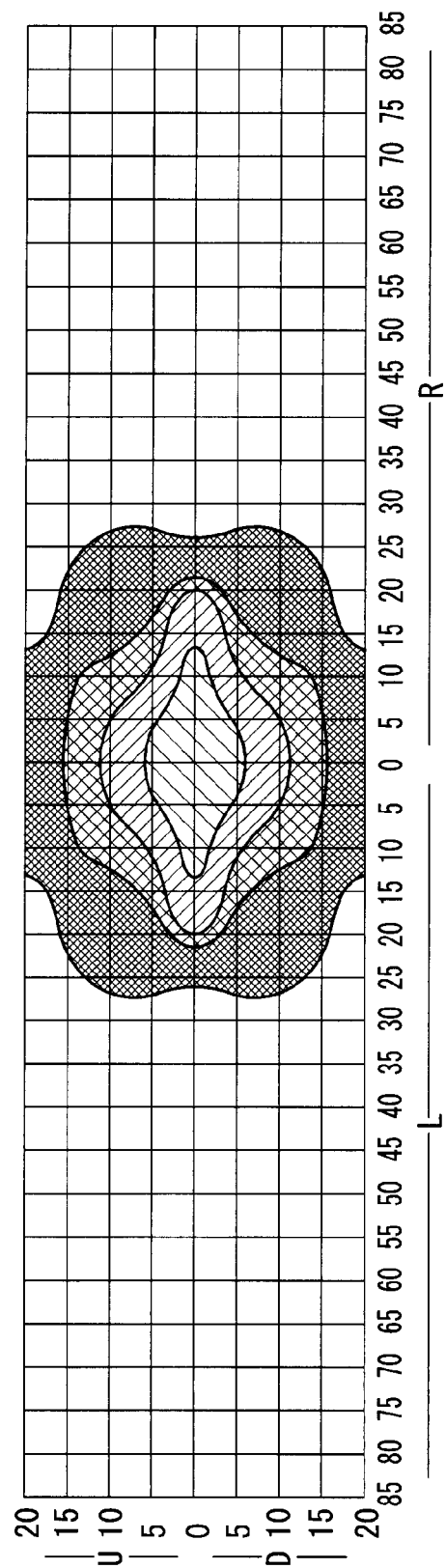
FIG. 11 is a diagram illustrating a light distribution pattern formed by the whole lens.
Figure 12:
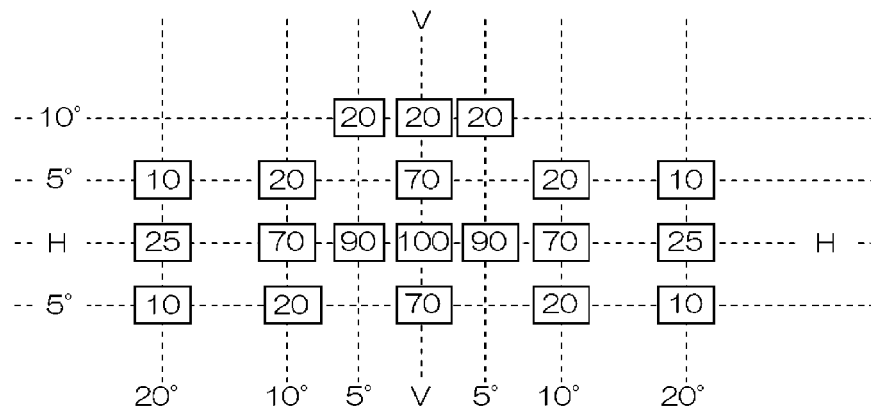
FIG. 12 is a table showing the luminous intensity distribution of the day-time-running light made in accordance with the principles of the presently disclosed subject matter.

As shown in FIG. 11, the lens 6 can form a light distribution pattern wide in the vertical direction by 10 degrees each and in the horizontal direction by 20 degrees each. (According to intended applications and/or desired standards in various countries, the lens 6 may be designed to provide a light distribution pattern wide in the vertical direction by up to about 15 degrees each and in the horizontal direction by up to about 80 degrees each, for example.) In this case, almost all of the light emitted from the LED light source 7 can be utilized by the center portion of the center light incident surface 20 and the toroidal surface 23 and the peripheral portion of the prisms 21 and the surrounding light output surface 24. According to the presently disclosed subject matter, high light utilization efficiency of 70% or higher can be achieved. The light distribution pattern of the present exemplary embodiment can satisfy the required standard in accordance with the required safety standard for a day-time-running light such as specified in ECE No. 87, for example, meaning that the vehicle light of the presently disclosed subject matter can have high reliability.

The prisms 21 including the total reflective surfaces can be disposed radially. Accordingly, the adjacent prisms 21 can be reflected by the total reflective surfaces, thereby providing a crystalline-like reflective state. Furthermore, the crystalline-like reflective state of the prisms 21 can be visually observed from outside, meaning an outer appearance having a high commercial value can be obtained. Furthermore, the depth from the light emitting surface of the LED light source 7 to the surface of the lens 6 can be as narrow as approx. 7 mm. As the desired light distribution pattern can be formed only by the lens 6, the number of parts for a vehicle light can be decreased, meaning that the vehicle light can be compact with reduced costs.

As discussed above, the center portion of the center light incident surface 20 and the toroidal surface 23 and the peripheral portion of the prisms 21 and the surrounding light output surface 24 can form a light distribution pattern satisfying specified light distribution properties for use in a vehicle light as a day-time-running light. The light emitted from the LED light source 7 in an oblique direction with respect to the optical axis Ax of the LED light source 7 can be utilized by the plurality of prisms 21. Accordingly, light utilization efficiency can be improved. Furthermore, the crystalline-like reflective state of the prisms 21 can be visually observed from outside, meaning that an outer appearance having a high commercial value can be obtained. A vehicle light such as a day-time-running light can be configured not by two parts including a diffusing lens and a condensing reflector, but by a single lens, thereby forming a desired light distribution pattern with a simple configuration. This configuration can provide a compact and less expensive lens for such a vehicle light.

Figure 13:
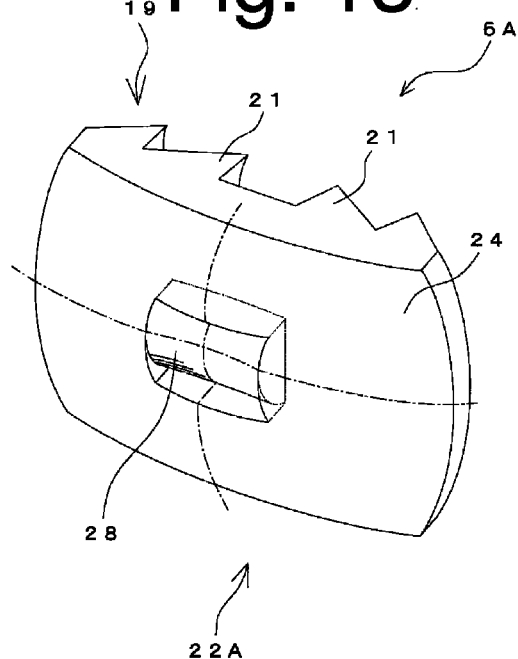
FIG. 13 is a perspective view illustrating the light output surface of the optical lens in accordance with another exemplary embodiment.

The toroidal surface 23 has a convex curved surface in the previous exemplary embodiment, but the presently disclosed subject matter is not limited to this example. For example, the toroidal surface may be a concave curved surface, as shown in FIG. 13, or a cylindrical surface. As long as the toroidal surface has a curved surface with different curvatures in the vertical and horizontal directions, these surfaces can be mixed.

Even when the lens 6A can have the light output surface 22A as shown in FIG. 13 with the concavely curved surface 28 in the horizontal direction, the lens 6A can output substantially parallel light due to the large vertical curvature of the curved surface 28 similar to the toroidal surface 23. Since the curved surface 28 has a small curvature in the horizontal direction in a concave manner, the refractive action in the horizontal direction can be enhanced. This configuration can form a wider light distribution pattern in the horizontal direction than the toroidal surface 23 does.

Figure 14:
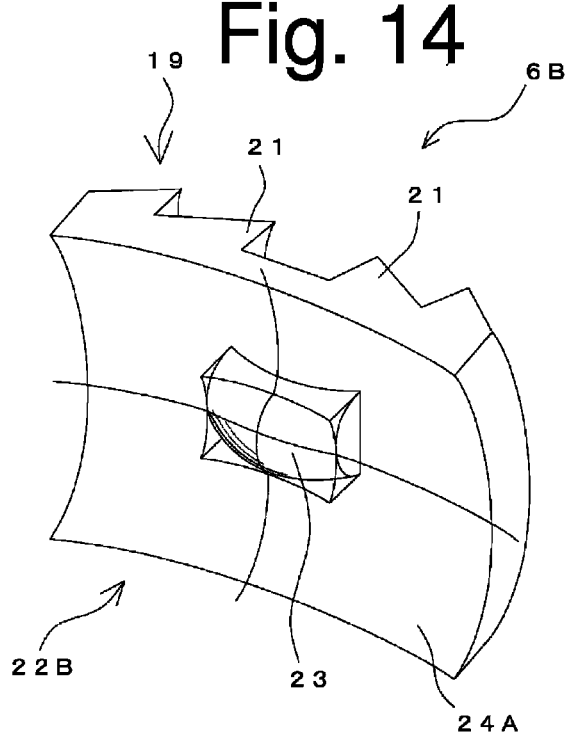
FIG. 14 is a perspective view illustrating the light output surface of the optical lens in accordance with still another exemplary embodiment of the disclosed subject matter.

Furthermore, the surrounding light output surface 24 of the present exemplary embodiment can be the convex curved surface, but the presently disclosed subject matter should not be limited to this example. For example, as shown in FIG. 14, the surrounding light output surface 24A of the light output surface 22B can have a concavely-curved surface with a small curvature. The thus configured light output surface 22B can condense the light in the center area with less power, meaning that the light distribution can be configured brighter in the horizontal direction. Furthermore, the light distribution pattern can be wider than the light output surface 22 in the horizontal direction.

The center light output surface being a toroidal surface can be concave, convex or cylindrical, and accordingly, the light output surface 22 of the lens 6 can be formed by the combinations of such a center light output surface and a concave or convex surrounding light output surface. For example, when the toroidal surface 23 is vertically convex and horizontally concave and the surrounding light output surface 24 is concave, the light distribution pattern in the center portion is decreased in light intensity and is brightened in the horizontal direction more than the previous exemplary embodiment. This can also expand the light distribution pattern in the horizontal direction.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An optical lens system for use in a vehicle light, the optical lens system comprising:
   a lens including a light incident surface and a light output surface, the light output surface disposed on an opposite side with respect to the light incident surface, wherein
      the light incident surface includes a center light incident surface and a surrounding light incident surface where a plurality of prisms are radially arranged around the center light incident surface,
      the light output surface includes a center light output surface corresponding to the center light incident surface and a surrounding light output surface corresponding to the plurality of prisms,
      each of the plurality of prisms includes an incident prism surface and a reflective prism surface,
      the incident prism surface is configured to allow light emitted from a light source disposed in front of the light incident surface to enter the lens,
      the reflective prism surface is configured to reflect light that is emitted from the light source, enters the incident prism surface, and reaches the reflective prism surface, toward the surrounding light output surface, the center light output surface is configured to allow light that is emitted from the light source and enters the center light incident surface to be output, and the surrounding light output surface is configured to allow light reflected from the reflective prism surface to be output, wherein:

the center light incident surface is formed as a convex lens surface configured to extend in a convex manner toward the light source:

the center light output surface is formed as a lens surface that is configured to diffuse light emitted from the light source and which enters the lens through the center light incident surface in a horizontal direction:

the surrounding light output surface is formed as a lens surface that is configured to diffuse light reflected from the reflection prism surfaces in a vertical direction and a horizontal direction so as to direct the light toward a center position.

2. An optical lens system for use in a vehicle light, the optical lens system comprising:

a lens including a light incident surface and a light output surface, the light output surface disposed on an opposite side with respect to the light incident surface, wherein the light incident surface includes a center light incident surface and a surrounding light incident surface where a plurality of prisms are radially arranged around the center light incident surface, the light output surface includes a center light output surface corresponding to the center light incident surface and a surrounding light output surface corresponding to the plurality of prisms, each of the plurality of prisms includes an incident prism surface and a reflective prism surface, the incident prism surface is configured to allow light emitted from a light source disposed in front of the light incident surface to enter the lens, the reflective prism surface is configured to reflect light that is emitted from the light source, enters the incident prism surface, and reaches the reflective prism surface, toward the surrounding light output surface, the center light output surface is configured to allow light that is emitted from the light source and enters the center light incident surface to be output, and the surrounding light output surface is configured to allow light reflected from the reflective prism surface to be output, wherein:

the center light output surface is a toroidal surface, the toroidal surface including a vertical cross section curved in a vertical direction for collimating light in the vertical direction and a horizontal cross section curved in a horizontal direction for diffusing light in the horizontal direction; and the surrounding light output surface is one of a convex lens surface and a concave lens surface.

3. An optical lens system for use in a vehicle light, the optical lens system comprising:

a lens including a light incident surface and a light output surface, the light output surface disposed on an opposite side with respect to the light incident surface, wherein the light incident surface includes a center light incident surface and a surrounding light incident surface where a plurality of prisms are radially arranged around the center light incident surface, the light output surface includes a center light output surface corresponding to the center light incident surface and a surrounding light output surface corresponding to the plurality of prisms, each of the plurality of prisms includes an incident prism surface and a reflective prism surface, the incident prism surface is configured to allow light emitted from a light source disposed in front of the light incident surface to enter the lens, the reflective prism surface is configured to reflect light that is emitted from the light source, enters the incident prism surface, and reaches the reflective prism surface, toward the surrounding light output surface, the center light output surface is configured to allow light that is emitted from the light source and enters the center light incident surface to be output, and the surrounding light output surface is configured to allow light reflected from the reflective prism surface to be output;

the light source which has an optical axis, wherein the incident prism surface is a light incident surface that is parallel with the optical axis of the light source and allows light emitted from the light source in an oblique direction with respect to the optical axis of the light source to enter the lens, and the reflective prism surface is a reflective surface configured to reflect light emitted from the light source and entering the incident prism surface so as to collimate the light emitted from the light source and entering the incident prism surface with respect to the optical axis.

4. The optical lens system according to claim 1, further comprising:

the light source which has an optical axis, wherein the incident prism surface is a light incident surface that is parallel with the optical axis of the light source and allows light emitted from the light source in an oblique direction with respect to the optical axis of the light source to enter the lens, and the reflective prism surface is a reflective surface configured to reflect light emitted from the light source and entering the incident prism surface so as to collimate the light emitted from the light source and entering the incident prism surface with respect to the optical axis.

5. The optical lens system according to claim 2, further comprising:

the light source which has an optical axis, wherein the incident prism surface is a light incident surface that is parallel with the optical axis of the light source and allows light emitted from the light source in an oblique direction with respect to the optical axis of the light source to enter the lens, and the reflective prism surface is a reflective surface configured to reflect light emitted from the light source and entering the incident prism surface so as to collimate the light emitted from the light source and entering the incident prism surface with respect to the optical axis.

6. A vehicle light comprising:

an LED light source; and an optical lens including a light incident surface and a light output surface, the light output surface disposed on an opposite side with respect to the light incident surface, wherein the light incident surface includes a center light incident surface and a surrounding light incident surface where a plurality of prisms are radially arranged around the center light incident surface, the light output surface includes a center light output surface corresponding to the center light incident surface and a surrounding light output surface corresponding to the plurality of prisms, each of the plurality of prisms includes an incident prism surface and a reflective prism surface, the light source is disposed in front of the light incident surface and the incident prism surface is configured to allow light emitted from the light source to enter the lens, the reflective prism surface is configured to reflect light that is emitted from the light source, enters the incident prism surface, and reaches the reflective prism surface, toward the surrounding light output surface, the center light output surface is configured to allow light that is emitted from the light source and enters the center light incident surface to be output, and the surrounding light output surface is configured to allow light reflected from the reflective prism surface to be output.

7. The vehicle light according to claim 6, wherein:
the center light incident surface is formed as a convex lens surface configured to extend in a convex manner toward the light source;
the center light output surface is formed as a lens surface that is configured to diffuse light emitted from the light source and which enters the lens through the center light incident surface in a horizontal direction;
the surrounding light output surface is formed as a lens surface that is configured to diffuse light reflected from the reflection prism surfaces in a vertical direction and a horizontal direction so as to direct the light toward a center position.

8. The vehicle light according to claim 6, wherein:
the center light output surface is a toroidal surface, the toroidal surface including a vertical cross section curved in a vertical direction for collimating light in the vertical direction and a horizontal cross section curved in a horizontal direction for diffusing light in the horizontal direction; and
the surrounding light output surface is one of a convex lens surface and a concave lens surface.

9. The vehicle light according to claim 6, further comprising:
the light source which has an optical axis, wherein
the incident prism surface is a light incident surface that is parallel with the optical axis of the light source and allows light emitted from the light source in an oblique direction with respect to the optical axis of the light source to enter the lens; and
the reflective prism surface is a reflective surface configured to reflect light emitted from the light source and entering the incident prism surface so as to collimate the light emitted from the light source and entering the incident prism surface with respect to the optical axis.

10. The vehicle light according to claim 7, further comprising:
the light source which has an optical axis, wherein
the incident prism surface is a light incident surface that is parallel with the optical axis of the light source and allows light emitted from the light source in an oblique direction with respect to the optical axis of the light source to enter the lens, and
the reflective prism surface is a reflective surface configured to reflect light emitted from the light source and entering the incident prism surface so as to collimate the light emitted from the light source and entering the incident prism surface with respect to the optical axis.

11. The vehicle light according to claim 8, further comprising:
the light source which has an optical axis, wherein
the incident prism surface is a light incident surface that is parallel with the optical axis of the light source and allows light emitted from the light source in an oblique direction with respect to the optical axis of the light source to enter the lens, and
the reflective prism surface is a reflective surface configured to reflect light emitted from the light source and entering the incident prism surface so as to collimate the light emitted from the light source and entering the incident prism surface with respect to the optical axis.

12. The vehicle light according to claim 6, wherein the vehicle light has an optical axis about which light is directed in an optical axis direction, and the LED light source is located a distance from the lens that is less than a thickness of the lens at the toroidal surface in the optical axis direction.

13. The vehicle light according to claim 6, wherein the optical lens consists of a one piece unitary and continuous piece of transparent material.

14. The optical lens system according to claim 1, further comprising:
the light source, and the light source is an LED light source.

15. The optical lens system according to claim 14, wherein the optical lens system has an optical axis about which light is directed in an optical axis direction, and the LED light source is located a distance from the lens that is less than a thickness of the lens at the toroidal surface in the optical axis direction.

16. The optical lens system according to claim 1, wherein the lens consists of a one piece unitary and continuous piece of transparent material.

17. The optical lens system according to claim 2, further comprising:
the light source, and the light source is an LED light source.

18. The optical lens system according to claim 3, further comprising:
the light source, and the light source is an LED light source.

19. The optical lens system according to claim 17, wherein the optical lens system has an optical axis about which light is directed in an optical axis direction, and the LED light source is located a distance from the lens that is less than a thickness of the lens at the toroidal surface in the optical axis direction.

20. The optical lens system according to claim 18, wherein the optical lens system has an optical axis about which light is directed in an optical axis direction, and the LED light source is located a distance from the lens that is less than a thickness of the lens at the toroidal surface in the optical axis direction.

* * * * *